United States Patent
King

(10) Patent No.: US 6,357,472 B1
(45) Date of Patent: Mar. 19, 2002

(54) SELF-TAPPING TEE

(75) Inventor: Thomas A. King, Ballwin, MO (US)

(73) Assignee: Tom King Harmony Products, Inc., Ballwin, MO (US)

(*) Notice: Subject to any disclaimer, the term of this patent is extended or adjusted under 35 U.S.C. 154(b) by 0 days.

(21) Appl. No.: 09/809,947

(22) Filed: Mar. 16, 2001

Related U.S. Application Data

(62) Division of application No. 09/434,729, filed on Nov. 5, 1999, now Pat. No. 6,216,723.

(51) Int. Cl.[7] .......................... F16K 43/00; F16L 41/06
(52) U.S. Cl. ....................................... 137/318; 285/197
(58) Field of Search .............................. 137/15.14, 318; 285/197

(56) References Cited

U.S. PATENT DOCUMENTS

| | | | | |
|---|---|---|---|---|
| 607,517 A | * | 7/1898 | Meserve | 285/197 |
| 635,534 A | * | 10/1899 | Florin | 285/197 |
| 4,239,265 A | * | 12/1980 | King, Sr. | 285/197 |
| 5,105,844 A | * | 4/1992 | King, Sr. | 137/15.14 |
| 5,694,972 A | * | 12/1997 | King | 137/318 |

* cited by examiner

Primary Examiner—George L. Walton
(74) Attorney, Agent, or Firm—Grace J. Fishel

(57) ABSTRACT

A self-tapping tee for heavy walled plastic pipe such as polyvinyl chloride (PVC) or thick walled polyethylene tubing. The self-tapping tee includes a saddle for gripping a tubular line to be tapped, a coupling tap with a stem for poking a hole in a sidewall of the line, with the sidewall of the line around the hole stretched about the stem, forming a seal, and a removable mandrel for supporting the stem while the hole is being made.

2 Claims, 4 Drawing Sheets

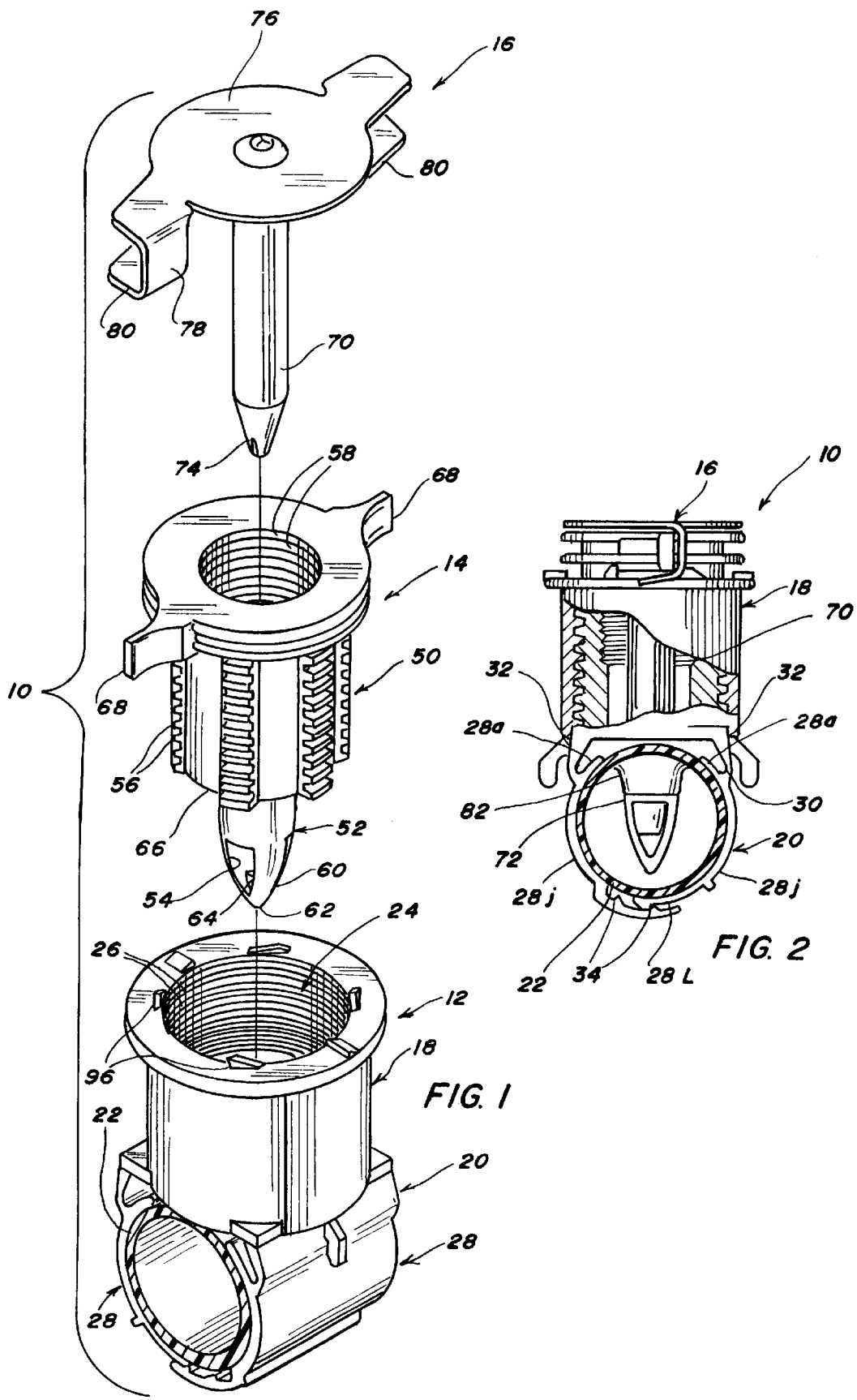

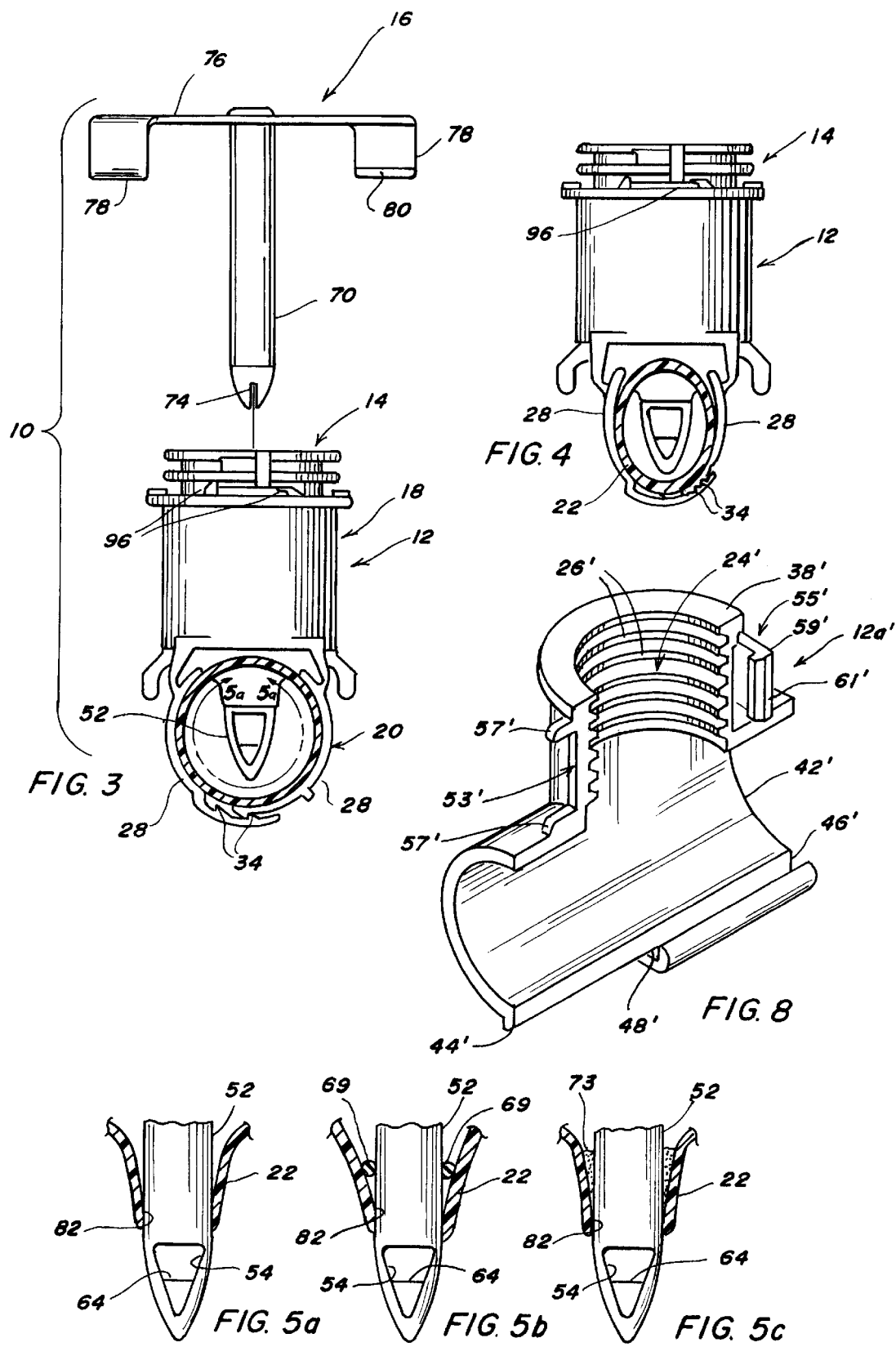

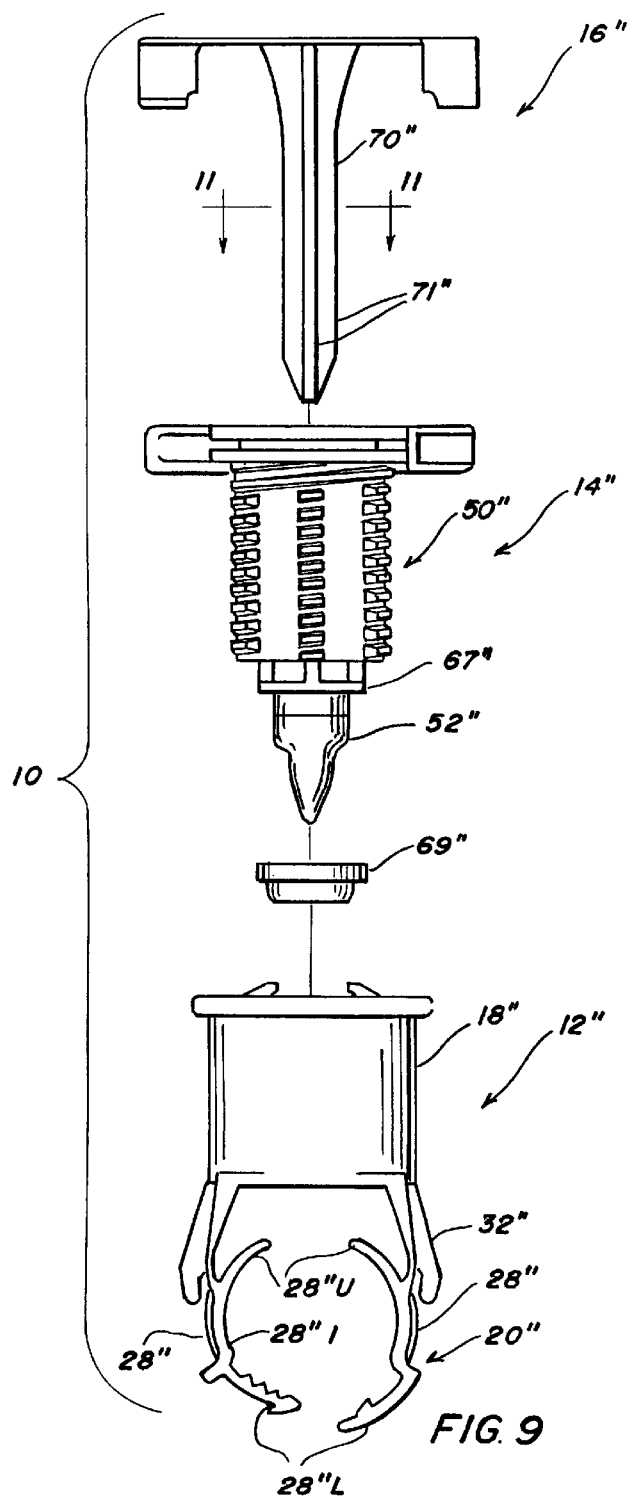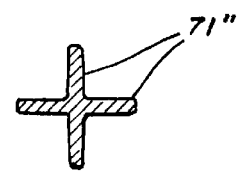
FIG. 11
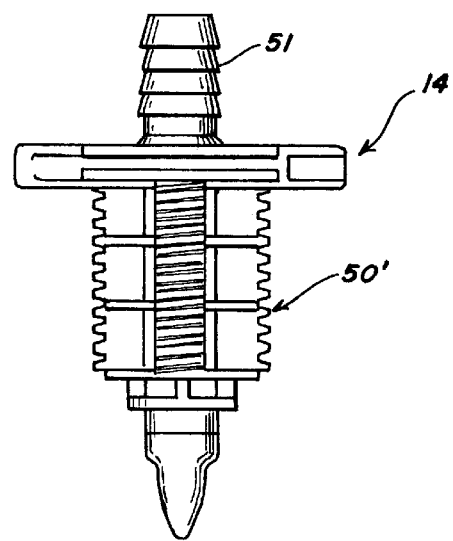
FIG. 10
FIG. 9

SELF-TAPPING TEE

This is a division, of application Ser. No. 09/434,729, Nov. 5, 1999, U.S. Pat. No. 6,216,723 B1.

BACKGROUND OF THE INVENTION

1. Field of the Invention

The present invention relates to a self-tapping tee with a coupling tap having a removable mandrel for use on heavy walled plastic pipe, such as polyvinyl chloride (PVC) pipe or thick walled polyethylene tubing, said self-tapping tee being useful without the mandrel on light walled plastic pipe or tubing.

2. Brief Description of the Prior Art

Plastic pipe is in common use in underground irrigation systems. Both light walled plastic pipe, such as polyethylene, and heavy walled plastic pipe, such as PVC and thick walled polyethylene tubing, are used. Heavy walled polyethylene tubing and PVC pipe have also been approved by various governmental agencies for natural gas.

With the advent of plastic pipe, it has been found that tapping tools for metal pipe are generally considered much too expensive for use with plastic pipe. Such tools for metal pipe are generally manufactured from high priced steel which is carefully machined and heat treated. In keeping with the change to plastic pipe, various tool designs of less expensive construction have been proposed.

There are self-tapping tees, formed of plastic material, for light walled plastic pipe such as described in U.S. Pat. No. 5,694,972 to King for Saddle Tee for Irrigation Lines. In this patent, a coupling tap is poked through polyethylene tubing or the like, with the sidewall of the tubing around the hole stretched about the tap, forming a seal.

Conventionally, when a plastic tee joint is installed on heavy walled plastic pipe, such as PVC or thick walled polyethylene, a hole is drilled or cut in the sidewall of the line. With a typical saddle tee for PVC pipe, glue is applied to the line, the saddle tee is snapped on the pipe over the glue and a hole is drilled in the line through a fitting after the glue has set. This operation is accompanied by some risk that the coupon or filings cut from the sidewall may be washed through the line and plug a valve or sprinkler head downstream from the tap. In use with PVC pipe, the King patent mentioned above teaches drilling a hole in the sidewall either before or after the tee is installed. Like other tee joints, the patent suggests gluing the self-tapping tee to the line and/or the use of o-rings or the like to ensure a good seal.

BRIEF SUMMARY OF THE INVENTION

In view of the above, it is an object of the present invention to provide a plastic, self-tapping tee for heavy walled plastic pipe. It is another object to provide a self-tapping tee that does not require the removal of material (e.g., filings or a coupon) from the sidewall of the line to establish the tap for the tee joint. Other objects and features of the invention will be in part apparent and in part pointed out hereinafter.

In accordance with the invention, a self-tapping tee for a tubular line includes a saddle, coupling tap and mandrel as more particularly described below. The saddle has a centrally bored housing mounted on a clamp for gripping the line being tapped, said housing having internal threads. The coupling tap has a stem attached to a hollow fitting, said stem being hollow and having at least one opening in the stem. The fitting is externally threaded and cooperatively received in the internal threads of the housing and the coupling tap has a length greater than the length of the housing. The mandrel is received in the hollow of the stem and removably attached to the coupling tap.

In use, the mandrel advances with the coupling tap as it is threaded into the housing of the saddle. The mandrel reinforces the stem of the coupling tap as it is pressed against the line being tapped and pokes a hole in the sidewall of the line, said mandrel thereafter being removed from the coupling tap.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 1 is an exploded perspective view showing a self-tapping tee in accordance with the present invention, said self-tapping tee including a mandrel, coupling tap and saddle;

FIG. 2 is a side elevation, partly in section, showing the mandrel, coupling tap and saddle installed on a line;

FIG. 3 is a side elevation showing the mandrel being withdrawn from the coupling tap after the coupling tap and saddle have been installed on the line;

FIG. 4 is a side elevation showing the coupling tap and saddle installed on a smaller line;

FIG. 5a is a detail on an enlarged scale taken along line 5a–5a in FIG. 3 showing how the sidewall of the line about the hole poked by the coupling tap is stretched around the stem of the tap forming a seal;

FIG. 5b shows a seal with the addition of an o-ring;

FIG. 5c shows a seal with the addition of glue;

FIG. 8 is a perspective view on an enlarged scale of one of two identical halves of the saddle shown in FIG. 6;

FIG. 9 is an exploded side elevation of another self-tapping tee with a different mandrel, coupling tap and saddle than shown in the other figures;

FIG. 10 is a side elevation of a further coupling tap; and,

FIG. 11 is a cross-section taken along line 11—11 in FIG. 9.

DETAILED DESCRIPTION OF THE INVENTION

Figures 6, 7:
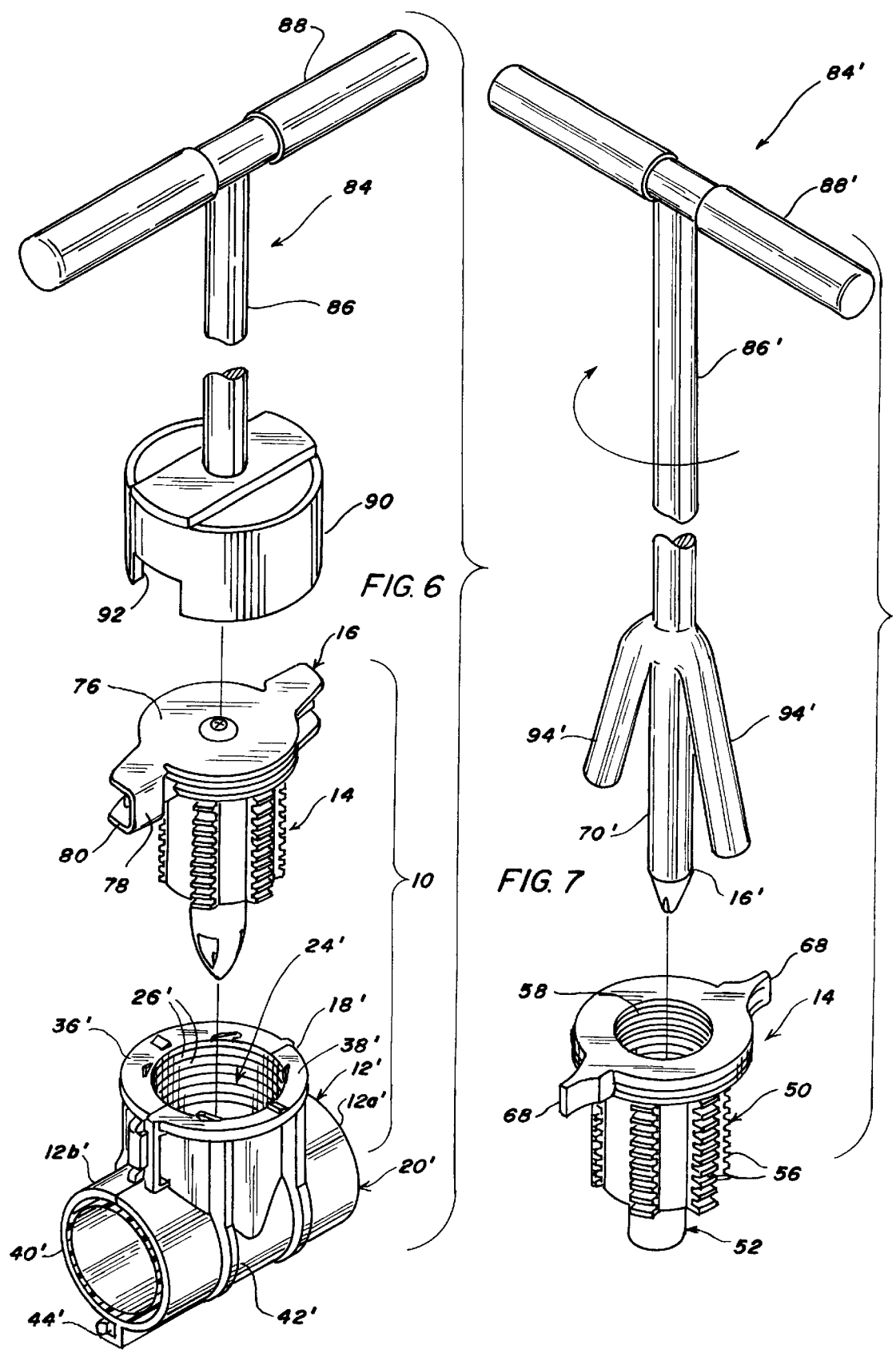
FIG. 6 is an exploded perspective view showing a driver for the mandrel with the same coupling tap as shown in the previous drawings but with a different saddle.
FIG. 7 is an exploded view of a driver-mandrel combination illustrated in use with a coupling tap having a truncated stem.

Referring to the drawings more particularly by reference character, reference numeral 10 refers to a self-tapping tee for use in tapping heavy walled plastic pipe such as PVC and thick walled polyethylene tubing. The term "heavy walled" refers to plastic pipe or tubing that is difficult to penetrate because of the material of which it is made (e.g., PVC) or because of wall thickness (e.g., thick walled polyethylene, polypropylene, polybutylene or the like). "Light walled" pipe or tubing refers to polyethylene tubing having a wall thickness up to about 0.100 inch, as well as other materials having a similar resistance to puncture. By way of example, but not limitation, heavy walled pipe includes Class 160 and 200 PVC pipe and polyethylene tubing having a wall thickness between about 0.135 and 0.200 inch.

Self-tapping tee 10 in major part includes a saddle 12, a plastic coupling tap 14 and a mandrel 16. Saddle 12 has a housing 18 mounted on a clamp 20 for gripping a line 22 being tapped. As more particularly described below, clamp 20 preferably closes around line 22 but may grip the line sufficiently without encircling it if the clamp is glued to the line. Housing 18 has a central bore 24 and internal threads 26. Three illustrative saddles 12 (FIGS. 1–4), 12' (FIG. 6) and 12" (FIG. 9) are shown in the drawings, the invention, however, is not limited to the particular saddles shown as will become more apparent. Saddle 12, as shown in FIGS. 1–4, and saddle 12" as shown in FIG. 9 are described in U.S. Pat. No. 5,694,972 to King.

Clamp 20 has a pair of opposing, arcuate clamp segments 28 having upper, lower and intermediate portions 28U, 28L, and 28I, respectively. Clamp segments 28 are attached on opposite sides of housing 18. Each segment 28 as shown in FIGS. 1–4, or at least one segment, of clamp is hinged at 30 along its intermediate portion 28I, opposite the clamp segment which it opposes, to an arm 32 which depends from housing 18. As shown in the drawings, hinge 30 is closer to upper portion 28U than lower portion 28L, facilitating entry of line 22 through the gap between the open segments. As saddle 12 is pressed on line 22, the pipe or tubing makes contact with upper portions 28U, causing lower portions 28L to pivot about 30, closing the clamp. Each of segments 28 has a locking part 34 at the free end of its lower portion 28L, cooperating with the locking part at the free end of the lower end portion 28L of the other clamp segment. Both locking parts 34 are of a substantially hook-like configuration, one curved inwardly and the other curved outwardly for interengagement. Locking parts 34 provide locking means for interconnecting the clamp segments without tools when the clamp is pressed onto line 22 and may have several locking positions for use with different diameter pipe or tubing, over a selected range.

Saddle 12", shown in FIG. 9, is like saddle 12 except that arms 32" are elongated, for use as described below, and clamp segments 28" (28"U, 28"I and 28"L) are smaller to accommodate smaller diameter pipe. Saddle 12" is particularly designed for use with smaller diameter pipe or the like.

Saddle 12', as shown in FIG. 6, is formed of two identical sections 12a' and 12b', one of which (12a') is shown in FIG. 8. Coupled together, sections 12a' and 12b' form a cylindrical housing 18' divided into two identical housing sections 36', 38' and a clamp 20' divided into two identical clamp sections 40', 42'. Like saddle 20, housing 18' has a central bore 24' with internal threads 26' and is mounted on clamp 20'. At the parting line between housing sections 36', 38', one side is outfitted with a female latch member 53', while the other side is outfitted with a male latch member 55'. Female latch member 53' has a pair of spaced sidewalls 57' and male latch member 55' has a resilient tongue 59' and a head 61' designed to latch between sidewalls 57'. At the bottom parting line between clamp sections 40', 42', one side is provisioned with a radially, outwardly extending rib 44', while the other side is provided with a second radially, outwardly extending rib 46', a free end of which is hooked over to form a groove 48'. When self mating members 12a' and 12b' are slid together, rib 44' of each member is received in groove 48' of the other at the bottom of clamp 20' and male latch member 55' is received in female latch member 53' of the other along the sides of sections 36', 38' keeping saddle 12' assembled. Coupling tap 14 will also keep the sections together as the tap is screwed into the saddle as more particularly described below.

Use of identical sections for saddle 12' reduces production costs since only one parting mold is necessary to make both members and there is no core to be unscrewed. It also eliminates the need to search for mating members since a user always has a mating pair, if he has two sections. On the other hand, saddle 12', unlike saddle 12, cannot be used on a range of different diameter lines 22.

Coupling tap 14 may be made of metal but plastic is preferred and includes a hollow fitting 50 attached to a stem 52. Stem 52 is hollow and has at least one opening 54 in the stem. Fitting 50 is externally threaded 56 and is cooperatively received in internal threads 26 of housing 24, 24' or the like. When fitting 50 has internal threads 58, it may be used for coupling a branch line, riser or the like. When fitting 50 has no threads, a branch line can be slip fitted into hollow fitting 50 and glued. Stem 52 is conically tapered towards a first end 60 and attached to fitting 50 at a second end. When stem 52 comes to a point 62, the point is preferably closed, with opening 54 located above. A transverse reinforcing web 64 may be provided in point 62. As shown in FIG. 7, the tip of stem 52 may be truncated for use as described hereinafter. In the form illustrated, fitting 50 is a cylinder, larger in diameter than stem 52, forming an abutment shoulder 66 at the junction therebetween. Fitting 50 is preferably provided with one or more wing grips 68 located on its periphery to aid a user in twisting it into saddle 12, saddle 12' or the like. In other instances, coupling tap 14' as shown in FIG. 10 may be a hollow fitting 50' with barbs 51'. A further variation on coupling tap is shown in FIG. 9 wherein coupling tap 14" has an abutment shoulder 67" on stem 52" and an annular seal 69" such as an o-ring or step grommet. Abutment shoulder 67" spaces annular seal 69" (e.g., step grommet) a selected distance from fitting 50" for better sealing around the hole punched in the sidewall of line 22. Abutment shoulder 67" also works in concert with upper portions 28"U of clamp 20" as a lock to prevent coupling tap 14" from laterally wobbling in saddle 12" and possibly breaking the seal.

Mandrel 16 has a shaft 70 that is received in hollow stem 52 of coupling tap 14 for reinforcement of the stem while coupling tap 14 is poking a hole 72 in line 22. Shaft 70 is sized for close fit in stem 52 and the tip of shaft 70 may be slotted 74 for receipt over web 64 (if present). Mandrel 16 may be slipped or threaded into stem 52 and is removably attached to coupling tap 14. When coupling tap has wing grips 68, shaft 70 is attached to a cap 76 with a pair of downwardly depending arms 78 which push on grips 68 as coupling tap 14 is screwed into housing 18. As seen in FIGS. 1 and 6, each of arms 78 includes a horizontally extending finger 80, pointing in a direction for embracing the underside of grips 68 as coupling tap 14 is screwed into housing 18. The force applied to grips 68 may be increased when arms 78 extend beyond the ends of grips 68, thus increasing the applied torque.

Referring now to FIG. 9, a second mandrel 16" is shown, which may be molded entirely of plastic. In this view shaft 70" is formed from two intersecting blades 71", mandrel 16" being otherwise similar to mandrel 16.

Coupling taps 14, 14' and 14" are preferably made of a hard plastic such as ABS, nylon, PVC or the like, while saddles 12, 12' and 12" may be formed of a less rigid material such as polyethylene. It will be understood, however, that coupling taps 14, 14' and 14" and saddles 12, 12' and 12" may be formed of other functionally suitable materials not previously mentioned such as metal. Mandrel 16 may be formed entirely of metal or partly of metal, for example with shaft 70 formed of a hard plastic such as used for coupling tap 14. Suitable mandrels are also illustrated by mandrel 16" formed entirely of plastic.

In use, saddle 12 is attached to heavy walled line 22 where a tee joint is desired. Coupling tap 14 is threaded into housing 18 until grips 68 are stopped by barbs 96 on housing 18. As coupling tap 14, with mandrel attached, is screwed into the housing, point 62 of stem 52 or shaft 70 (when stem is truncated) contacts a sidewall of line 22 and pokes through, the sidewall of the pipe or tubing around the hole stretched about the point, forming a seal 82, best seen in detail FIG. 5a. Once this seal has been achieved, mandrel 16 may be withdrawn from coupling tap 14 and a branch line or the like threaded into fitting 50. With saddle 12', as coupling tap 14 is threaded into housing 18', mating members 40', 42' of clamp 20', are locked together and cannot be slid apart, otherwise both saddles function the same.

Coupling tap 14", saddle 12" and mandrel 16" as shown in FIG. 9 are used in a similar manner to their counterparts described above except that seal 82 is augmented by step grommet 69" or an o-ring 69 as shown in FIG. 5b. Glue 73 may be also be used, as shown in FIG. 5c, with any of the coupling taps (14, 14', 14" or the like). Saddle 12" which is spaced below housing 18" by arms 32" permits the use of the same length coupling tap 14" for a range of different sized lines 22. This is advantageous when line 22 is made of stiff walled material such as PVC. When line 22 is flexible, as shown in FIG. 4, clamp 20 may pinch the line into an oval shape in cross-section, thereby facilitating the use of coupling tap 14 which would otherwise be too long and pierce both sides of the line.

As shown in FIG. 6, a driver 84 may be used for reaching mandrel 16 when self-tapping tee 10 is installed on a line 22, for example, deep within a hole. Driver 84 includes a long handled shaft 86 with a t-bar 88 attached at a first end and with a head 90 at its second end. Head 90 may be slotted at 92 such that it straddles grips 68 and arms 78. It will be understood that t-bar 88 increases the length of the lever arm, thus amplifying the force applied to coupling tap 14. Another variation is shown in FIG. 7. In this instance shaft 70 of mandrel 16 is integrally formed with a shaft 86' of a second driver 84'. Cap 76, arms 78 and fingers 80 are eliminated and outwardly flared legs 94' attached to shaft 86'. As will be apparent, legs 94' can be used to push grips 68 in the same manner as arms 78 with t-bar 88' amplifying the applied force. When the tip of stem 52 is truncated, as shown in FIG. 7, withdrawal of mandrel 16' increases the flow of water through stem 52 and line 22 as compared to a coupling tap with a closed point.

When line 22 is light walled, self-tapping tee 10 may be used without mandrel 16 in the manner described in U.S. Pat. No. 5,694,972 to King. Hence only coupling taps and saddles need be inventoried by the user, making tee joints on both light walled and heavy walled pipe or tubing.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A saddle for a tubular line, said saddle formed of two substantially identical sections, each section comprising one-half of a cylindrical housing mounted on one-half of a cylindrical clamp, each one-half of the cylindrical housing having a female latch member on one side of the parting line between the halves, said female latch member having a pair of spaced sidewalls, and a male latch member on the other side, said male latch member having a resilient tongue and a head designed to latch between the spaced sidewalls of the female latch member, and each one-half of the cylindrical clamp, at the bottom parting line between the halves, having a portion with a radially, outwardly extending rib and a portion with a second radially, outwardly extending rib with a tree end hooked over to form a groove for receipt of the first rib of the other section, whereby said sections are assembled first by sliding interaction of said first rib in the groove of the second rib of the other section at the bottom parting line of the cylindrical clamp about the tubular line and thereafter latching interaction of the male latching member in the female latching member of the other section at the parting line between of the cylindrical housing to fixedly secure the saddle about the tubular line.

2. The saddle of claim 1 wherein the cylindrical housing has a threaded portion for receiving a coupling.

* * * * *